(12) United States Patent
Revidat et al.

(10) Patent No.: US 11,371,469 B2
(45) Date of Patent: Jun. 28, 2022

(54) FUEL PUMP FOR A LIQUID FUEL WATER INJECTION SYSTEM OF A MOTOR VEHICLE

(71) Applicants: Hyundai Motor Company, Seoul (KR); Kia Motors Corporation, Seoul (KR)

(72) Inventors: Stephan Revidat, Langen (DE); Michael Winkler, Wiesbaden (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 47 days.

(21) Appl. No.: 16/931,701

(22) Filed: Jul. 17, 2020

(65) Prior Publication Data
US 2021/0363941 A1    Nov. 25, 2021

(30) Foreign Application Priority Data

May 25, 2020    (DE) .......................... 102020206494.6

(51) Int. Cl.
*F02M 25/022*    (2006.01)
*F02M 37/00*    (2006.01)
(Continued)

(52) U.S. Cl.
CPC ......... *F02M 25/0228* (2013.01); *B01D 17/04* (2013.01); *B01F 23/4105* (2022.01);
(Continued)

(58) Field of Classification Search
CPC ........... F02M 25/0228; F02M 25/0222; F02M 25/0225; F02M 37/0023; F02M 37/0052;
(Continued)

(56) References Cited

U.S. PATENT DOCUMENTS

| 4,734,008 A * | 3/1988 | Roth ................... F02M 37/048 |
| | | 415/169.1 |
| 2005/0034710 A1* | 2/2005 | Crary ..................... F16K 35/00 |
| | | 123/457 |

(Continued)

FOREIGN PATENT DOCUMENTS

| DE | 10 2014 215 774 B4 | 6/2016 | |
| DE | 10 2015 224 402 A1 | 6/2017 | |
| WO | WO-2017084765 A1 * | 5/2017 | ......... F02D 41/0025 |

*Primary Examiner* — Jacob M Amick
*Assistant Examiner* — Charles J Brauch
(74) *Attorney, Agent, or Firm* — Fox Rothschild LLP

(57) ABSTRACT

A fuel pump for a liquid fuel water injection system of a motor vehicle is provided. The fuel pump includes a low-pressure pump that mixes water from a water tank of the motor vehicle with liquid fuel from a fuel tank of the motor vehicle to a liquid fuel water emulsion and provides the liquid fuel water emulsion at a low pressure. A high-pressure pump is in fluid communication with the low-pressure pump and compresses the liquid fuel water emulsion from the low pressure to a high pressure for injecting the liquid fuel water emulsion into an internal combustion engine of the motor vehicle via an injection rail of the motor vehicle. A pump drive drives the low-pressure pump and the high-pressure pump synchronously with a pump frequency independently from an engine speed of the internal combustion engine of the motor vehicle.

18 Claims, 4 Drawing Sheets

(51) Int. Cl.
*F02M 37/08* (2006.01)
*F02M 59/10* (2006.01)
*F02B 47/02* (2006.01)
*B01D 17/04* (2006.01)
*F02M 55/02* (2006.01)
*B01F 23/41* (2022.01)
*B01F 35/88* (2022.01)
*B01F 101/00* (2022.01)

(52) U.S. Cl.
CPC ............ *B01F 35/883* (2022.01); *F02B 47/02* (2013.01); *F02M 25/0222* (2013.01); *F02M 25/0225* (2013.01); *F02M 37/0023* (2013.01); *F02M 37/0052* (2013.01); *F02M 37/0064* (2013.01); *F02M 37/08* (2013.01); *F02M 55/025* (2013.01); *F02M 59/10* (2013.01); *B01F 23/4145* (2022.01); *B01F 2101/505* (2022.01)

(58) Field of Classification Search
CPC .. F02M 37/0064; F02M 37/08; F02M 55/025; F02M 59/10; B01D 17/04; B01F 3/0811; B01F 15/0479; B01F 2003/0842; B01F 2215/0088; F02B 47/02
See application file for complete search history.

(56) References Cited

U.S. PATENT DOCUMENTS

2009/0078232 A1\* 3/2009 Kramb .................. F02B 47/02
 123/25 R
2010/0076634 A1\* 3/2010 Brigham ............... B60W 10/02
 701/22

\* cited by examiner

FUEL PUMP FOR A LIQUID FUEL WATER INJECTION SYSTEM OF A MOTOR VEHICLE

CROSS REFERENCE TO RELATED APPLICATION(S)

The present application claims priority to German Patent Application No. 10-2020-206494.6 filed on May 25, 2020, the entire contents of which is incorporated herein for all purposes by this reference.

TECHNICAL FIELD

The present disclosure relates to a fuel pump for a liquid fuel water injection system of a motor vehicle, and more particularly, to a fuel pump for a gasoline water direct injection system of a motor vehicle. disclosure

BACKGROUND

In order to fulfill customer demands on passenger vehicles and to meet future CO2 emission as well as exhaust gas emission regulation targets, modern high-efficient gasoline combustion engines often rely on gasoline direct injection (GDI). This technology enables substantial benefits especially for engines with high specific power output and compliant with the newer exhaust gas regulations. GDI generally offers the possibility to reduce the number of assembled components as well as the overall weight.

The fuel supply architecture of modern GDI engines usually delivers gasoline from a fuel tank at low pressure of around 3 to 6 bar by a continuously driven supply pump. The gasoline is then passed to a high-pressure pump configured to pressurize the gasoline to a pressure of roughly 50 to 500 bar and pump the gasoline into an injection rail and from there further to the fuel injectors. The gasoline pressure is regulated by the engine control unit (ECU) of the vehicle via the pumps.

The high-pressure pump is typically mounted and fixed onto the assembly of the respective internal combustion engine (due to the high forces of ~3500 N and higher a very rigid connection is required) and mechanically driven by a camshaft of the engine. Thus, pump frequency and/or pump rate of the high-pressure pump are coupled to the engine speed of the internal combustion engine. Furthermore, typical pump systems have a high energy demand and need to be matched to the fuel demands of the respective engine. Due to the fixed connection of the high-pressure pump, the pump's displacement needs to be matched to the highest injection quantity per stroke of the engine. As a result, typical systems may not reach the highest possible efficiencies and different types of vehicles may require different pump configurations, implying that various different pumps may be needed to fulfill consumer needs.

To stabilize pressure along an injection rail and to avoid high energy consumption, modern high pressure pumps usually employ a digital inlet valve (DIV), which regulates the amount of pressurized fuel that is transferred from low pressure to high pressure in a given time interval. DIV mostly utilize a valve that is electromagnetically actuated and emits sound at a high frequency of roughly 5 to 10 kHz. This generates mechanic noise known as "ticking", which may be perceived as uncomfortable by end-users preferring a smooth driving experience (e.g., in particular due to the mounting position of the system on top of the engine assembly). To reduce these sound emissions, current solutions often rely on significant sound insulation around the high-pressure pump potentially leading to additional costs, weight and lowered performance due to fuel heat up. In addition, since pump systems usually are matched to engine fuel demands, high variety by possible system combinations may increase costs for the manufacturer.

Water injection into internal combustion engines has been known as a powerful tool to increase maximum power and/or decrease emissions. By injecting water, combustion temperatures may be cooled down to protect vehicle components like turbo charger and after treatment systems in situations with high engine demand. Direct injection of water into the combustion chamber, so-called Gasoline Water Direct Injection (GWDI), is often realized through the use of an emulsion with a variable water-fuel ratio. Since water and fuel need to be mixed with a high precision, in particular under highly dynamic engine conditions, and to ensure sufficient supply even at highest power and speed ranges, size and complexity of conventional injection systems may increase significantly. Moreover, the fuel water emulsion may decompose into its original components, in particular during inactive periods of engine operation. This effect may compromise stability of the emulsion, which then may adversely affect engine performance at a later point in time. Moreover, the two separated fluids may reside within engine parts such as rails and pipes, which may influence durability of the entire system.

SUMMARY

Hence, there is a need to find solutions for liquid fuel water injection systems with reduced costs, increased effectiveness and durability as well as reduced sound emissions. Accordingly, the present disclosure provides a fuel pump for a liquid fuel water injection system of a motor vehicle.

According to one aspect of the disclosure, a fuel pump for a liquid fuel water injection system, in particular a gasoline water direct injection system, of a motor vehicle may include a low-pressure pump configured to mix water from a water tank of the motor vehicle with liquid fuel from a fuel tank of the motor vehicle to a liquid fuel water emulsion and provide the liquid fuel water emulsion at a low pressure; a high-pressure pump in fluid communication with the low-pressure pump and configured to compress the liquid fuel water emulsion from the low pressure to a high pressure for injecting the liquid fuel water emulsion into an internal combustion engine of the motor vehicle via an injection rail of the motor vehicle; and a pump drive configured to drive the low-pressure pump and the high-pressure pump synchronously with a pump frequency independently from an engine speed of the internal combustion engine of the motor vehicle.

According to another aspect of the disclosure, a motor vehicle has an internal combustion engine and a liquid fuel water injection system configured to inject liquid fuel into the internal combustion engine via an injection rail. The liquid fuel water injection system has a fuel pump according to the disclosure.

According to yet another aspect of the disclosure, a method for operating a fuel pump according to the disclosure may include mixing water from the water tank of the motor vehicle with liquid fuel from the fuel tank of the motor vehicle to a liquid fuel water emulsion; pumping the liquid fuel water emulsion with the low-pressure pump at the low pressure; and compressing the liquid fuel water emulsion from the low pressure to the high pressure with the high-pressure pump for injecting the liquid fuel water emulsion into the internal combustion engine of the motor vehicle via the injection rail of the motor vehicle. The low-pressure pump and the high-pressure pump may be driven synchronously by the pump drive with a pump frequency independently from an engine speed of the internal combustion engine of the motor vehicle.

The present disclosure decouples the pumps from the internal combustion engine and instead drives the low-pressure and the high-pressure pump together with a dedicated pump drive, e.g. an electric machine. Accordingly, the same pump configuration may be used for various different engines and vehicle types, resulting in a reduction of total costs and a simplification of the vehicle supply infrastructure. In addition, the pump system no longer needs to be mounted on top of the internal combustion engine and hence sound emissions, in particular those of the DIV, may be reduced or completely avoided. In fact, the pump system may be installed anywhere in the vehicle, e.g. in an underfloor or in an isolated box within the engine cabinet spaced apart from the actual engine. Moreover, the DIV of the pump system may be eliminated entirely. By utilizing one common drive for both pump systems, power consumption may be reduced significantly by optimized state of operation.

According to the disclosure, the pump drive may be configured to drive the pumps with a pump frequency independently from an engine speed of the internal combustion engine of the motor vehicle. Due to the presence of a dedicated pump drive, the pumps no longer need to be mechanically driven by a camshaft of the engine. Hence, the pump frequency does not need to be coupled to the engine speed anymore. Accordingly, the pump configuration and behavior may be tuned in an optimized way for each type of vehicle, type of engine and driving situation with one single type of pump. The resulting system may thus be optimized to provide the highest possible efficiency or other features such as start ability and independent rail pressure for each case without having to compromise due to an interconnection with the engine.

Additionally, the present disclosure may simplify the mixing process of water and liquid fuel by introducing a single low-pressure pump receiving both water and fuel directly from the respective supply tanks, mixing them and pressurizing them to a low pressure, e.g. 3 to 6 bar. The low-pressure pump is thus able to function as a soak (e.g., suction) pump that receives water and fuel without the requirement of any dedicated supply pumps for each of these substances. For example, both mixing components may be provided within their respective tanks at pressure below 1 bar. Accordingly, cost and power consumption of the pump system may further be reduced. The emulsion components may be mixed directly within the low-pressure pump. As the pump system is driven independently of the engine speed, the total volume flow of the mixed fluid may be adjusted in an optimal way according to the current need of the driving situation. Even high-volume flows required for sport engines, e.g. 130 l/h and more, may be provided. For example, a side channel pump capable of soaking gas media may be employed as low-pressure pump, which would allow direct mixing via an internal swirl movement of the medium.

It is to be understood that the fuel pump of the disclosure may also be operated in a mode where only liquid fuel is pumped into the internal combustion engine from the fuel tank without any admixture of water. In fact, during normal engine operation water injection is often not required. Water injection is particularly relevant in dynamic driving situations and for high engine loads. Hence, the amount of water in the liquid fuel water emulsion may be set to minimal values or even zero by the fuel pump in certain driving situations, e.g. by closing the connection to the water tank by a valve. Accordingly, the present system is able to selectively admix water to the liquid fuel stream based on the driving situation and/or engine condition. It is thus to be understood in the following that the system may also transport liquid fuel instead of a liquid fuel water emulsion and inject it into the engine.

The solution of the disclosure may be particularly employed for GDI systems. However, the disclosure is also applicable to other fuel injection systems based on liquid and/or liquefied fuels comprising but not limited to liquefied natural gas (LNG), compressed natural gas (CNG), liquefied petroleum gas (LPG), hydrogen and so on.

According to an exemplary embodiment of the disclosure, the fuel pump may further include a throttle valve configured to adjust an amount of water provided from the water tank to be mixed with the liquid fuel to the liquid fuel water emulsion within the low-pressure pump. Additionally, or alternatively, also the liquid fuel amount from the fuel tank may be adjusted via a throttle valve. Accordingly, mixing levels may be controlled during the pre-mixing in a simplified and yet precise way by adjusting inlet flow ratios via the throttle valve. This also means that the emulsion mixture may be adjusted at any point in time dynamically.

According to an exemplary embodiment of the disclosure, the pump drive may be configured as an electric motor. It is to be understood however that the pump drive may be another power source driven independently of the engine speed of the internal combustion engine. For example, the pump drive may be a pneumatic motor, a hydraulic motor and so on.

According to an exemplary embodiment of the disclosure, the pump drive may include at least two electric submachines axially coupled to each other between the low-pressure pump and the high-pressure pump. For example, two brushless direct current (DC) motors may be used to generate a sufficient power output, e.g. 500 W or more, and an additional boost functionality to manage high engine gradients, e.g. to boost the power output from 500 W up to 1000 W on very short time scales. As a result, flexibility for high pressure and/or flow gradients may be realized. Moreover, a stable injection rail pressure may be secured over the full dynamic range of the engine/vehicle. In other exemplary embodiments, even three, four or more electric submachines may be coupled to each other to further increase flexibility of the system.

According to an exemplary embodiment of the disclosure, each electric submachine may include a helical cooling channel configured to flush the liquid fuel water emulsion from a low-pressure side to a high-pressure side along a helical path around an axial direction of the respective electric submachine. Accordingly, the liquid fuel water emulsion (or, alternatively, only fuel) may be used to cool down the pump drive, which inevitably generates a certain amount of heat. As the electric submachines are mounted between the low-pressure pump and the high-pressure pump, the liquid may be used for this purpose travelling between the low-pressure side and the high-pressure side. For example, the liquid may be guided through an outer hull of the electric submachines.

As an additional benefit, the liquid fuel water emulsion may be maintained under constant movement as it tumbles along the helical cooling channels. This means that the homogeneity of the mixture may be stabilized merely by flushing the liquid fuel water emulsion through the cooling channels. It will be clear to the person of ordinary skill in the art that a similar cooling mechanism may also be employed in case that the pump drive is not split up into two or more submachines. In particular, the pump drive may still be mounted between the low-pressure pump and the high-pressure pump and may carry one or several helical cooling channels, e.g. along an outer side or hull, from the low-pressure side to the high-pressure side.

Additionally, according to an exemplary embodiment of the disclosure, each helical cooling channel may be integrated into an outer hull of the respective electric submachine. Accordingly, a cooling flow along the complete outer side or surface of the electric submachines may be accomplished for optimized cooling of the pump drive. The fuel pump may further include a hydraulic regulator configured to provide a pressure regulated connection between the electric submachines for conducting the liquid fuel water emulsion between the electric submachines.

The hydraulic regulator may be configured to adjust the internal flow of the liquid and maintain internal pressure of the liquid flow. The internal pressure regulation system may help to properly fill the fuel pump with the liquid and to cool the pump drive. The hydraulic regulator may include an overflow return valve for pressure regulating a backflow of liquid from the high-pressure side to the low-pressure side.

Since the low-pressure pump typically requires a higher displacement of ~10-20% than the high-pressure pump, any surplus liquid may be flushed back to the low-pressure side. The hydraulic regulator thus may provide a regulation line besides a main supply line. This may become necessary in certain applications for three reasons. First, the fuel pump may need to uphold a certain relative pressure. Second, first soaking may require recirculation to evacuate the system. Third, any liquid remaining after the engine is shut off may heat up, which could increase an internal pressure as well as a vapor content. An increasing pressure could be released through this valve.

The regulation may provide additional advantages over conventional systems. The usually utilized pressure membranes are not required anymore. And furthermore, such a pressure stabilization may allow to use various liquefied fuels like LNG, LPG, CNG etc. The overflow return valve may, for example, be configured as a naturally closed poppet valve or the like, which opens at a predefined pressure level, e.g. 5 bar. Alternatively, the overflow return valve may however also be actuated electrically, for example.

According to an exemplary embodiment of the disclosure, the overflow return valve may be configured to deliver the backflow of liquid to the low-pressure fuel pump for mixing of the liquid fuel water emulsion. For example, liquid fuel may be flushed back to an inlet of the low-pressure pump. Similarly, a surplus of liquid fuel water emulsion may be flushed back to the inlet of the low-pressure pump.

According to an exemplary embodiment of the disclosure, the fuel pump may further include an emulsion separation device configured to separate water and liquid fuel from the liquid fuel water emulsion. The overflow return valve may be configured to deliver the backflow of liquid to the emulsion separation device. For example, a surplus of liquid fuel water emulsion may be conducted to the separation device where it is then separated back into the liquid fuel component and the water component. Both components of the emulsion may then be transported separately either back into their respective supply tanks or directly to an inlet of the low-pressure pump for instant usage.

Additionally, according to an exemplary embodiment of the disclosure, the hydraulic regulator may include an injection rail relief configured to receive liquid from the injection rail back into the hydraulic regulator. Correspondingly, the injection rail may include a pressure relief valve configured to purge liquid from the injection rail to the fuel pump. The method may thus particularly include purging the liquid fuel water emulsion from the injection rail by the pressure relief valve. Moreover, the method may include separating the purged liquid fuel water emulsion into water and liquid fuel by an emulsion separation device.

The present pump system thus also functions as a purging system for purging the emulsion or the particular components, e.g. fuel. This is possible in the present system mainly because the whole supply system of low- and high-pressure pumps is able to run independently of the engine. Thus, recirculation of any liquid in the injection system is possible, in particular surplus fluid in the injection rail and the connection pipes. Accordingly, any fluid remaining in the injection system may be reused, that is, remixed during operation and, in particular, during engine start (e.g. start/stop). Moreover, draining of the liquids within the injection system is possible after engine shut off to avoid fuel aging which further increases the durability of the system.

Liquid may thus be constantly mixed and drained during operation, which means that stability of the emulsion may be preserved. For example, the lower density media phase of the emulsion may be drained from the injection system, e.g. gasoline in case of a gasoline-water mixture (in case that the emulsion separates/dissolves into the individual substances, which will happen according to the density of the respective substance).

The injection rail relief may be provided as a naturally closed poppet valve or the like. However, alternatively, an electrically actuated mechanism may be used as well. For example, the pressure relief valve may be operated and actuated by the engine control unit (ECU) to permanently (partially) open as long as the pressure in the injection rail is greater than a predefined pressure threshold, e.g. about 2 bar. Alternatively, the pressure relief valve may open completely to release the liquid abruptly above a certain pressure threshold.

According to an exemplary embodiment of the disclosure, the high-pressure pump may include a suction piston for compressing the liquid fuel water emulsion conducted from the low-pressure pump to the high-pressure pump and a crank drive driven by the pump drive and configured to drive the suction piston. In the present case, a crank drive actuated by the pump drive may replace the typically employed camshaft driven by the internal combustion engine. The suction piston (or plunger) may be configured in an optimized way to provide a convenient lift range (e.g., lift range for low mass per lift, however high enough to compress and deliver enough liquid). The solution may employ one common shaft for synchronous liquid flow via the low-pressure pump to the high-pressure pump.

According to an exemplary embodiment of the disclosure, the fuel pump may be configured to operate in a pump frequency range between 0 rpm and about 16.000 rpm with a flow rate between 0 kg/h and about 100 kg/h. The pressure at the injection rail may be stabilized and adjusted precisely in case the liquid is delivered in such small hubs over such a large frequency range. Additionally, the low pressure may be in a range between 1 bar and about 10 bar and/or the high pressure may be in a range between about 50 bar and 500 bar. For example, the low pressure may be between roughly about 3 bar and 6 bar. The high pressure on the other hand may be between about 250 bar and 350 bar, for example.

According to an exemplary embodiment of the disclosure, the pump drive may be a brushless DC motor. The electric motor may provide enough power and torque required by the present solution. The electric motor may have a maximum power output of at least 500 W at an operating voltage of 48 V. The fuel pump may further include a pump controller configured to operate the fuel pump based on pressure control commands based on on-board diagnostics CAN signals.

The pump controller may include a rail pressure control logic, e.g. based on an actual rail pressure and a rail pressure set point. By using on-board diagnostics CAN signals (OBD-CAN) the system may be further simplified as OBD messages may be used for simple control features, e.g. rail pressure control. Since these types of messages follow international standards, it may be possible to provide the fuel pump in any vehicle independently from the manufacturer.

According to an exemplary embodiment of the disclosure, the fuel pump may be mechanically detached from the internal combustion engine of the motor vehicle. However, the fuel pump may be in fluid communication with the injection rail of the internal combustion engine via a liquid supply line. For example, the fuel pump may be mounted within an underfloor of a vehicle and thus be spaced apart from the internal combustion engine. A hose, tube or pipe may provide the necessary fluid connection to an injection rail of the engine. The supply line length of the liquid supply line should be as short as possible to prevent the emulsion from separating along the length of the line.

According to an exemplary embodiment of the disclosure, the fuel pump may be powered by a vehicle battery of the motor vehicle. For example, a standard 12 V battery may be employed. When a 48 V electric motor is used, a DC/DC converter may be coupled between the battery and the electric motor. According to an exemplary embodiment of the disclosure, the pump controller of the fuel pump may be communicatively coupled to an engine controller of the motor vehicle. Thus, a dedicated pump controller may be provided, which may, for example, receive power from a battery of the vehicle and may power the pump drive of the fuel pump. However, in other exemplary embodiments, the pump controller may be integrated into the engine controller.

The disclosure will be explained in greater detail with reference to exemplary embodiments depicted in the drawings as appended.

BRIEF DESCRIPTION OF THE DRAWINGS

The accompanying drawings are included to provide a further understanding of the present disclosure and are incorporated in and constitute a part of this specification. The drawings illustrate the exemplary embodiments of the present disclosure and together with the description serve to explain the principles of the disclosure. Other exemplary embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

Figure 1:
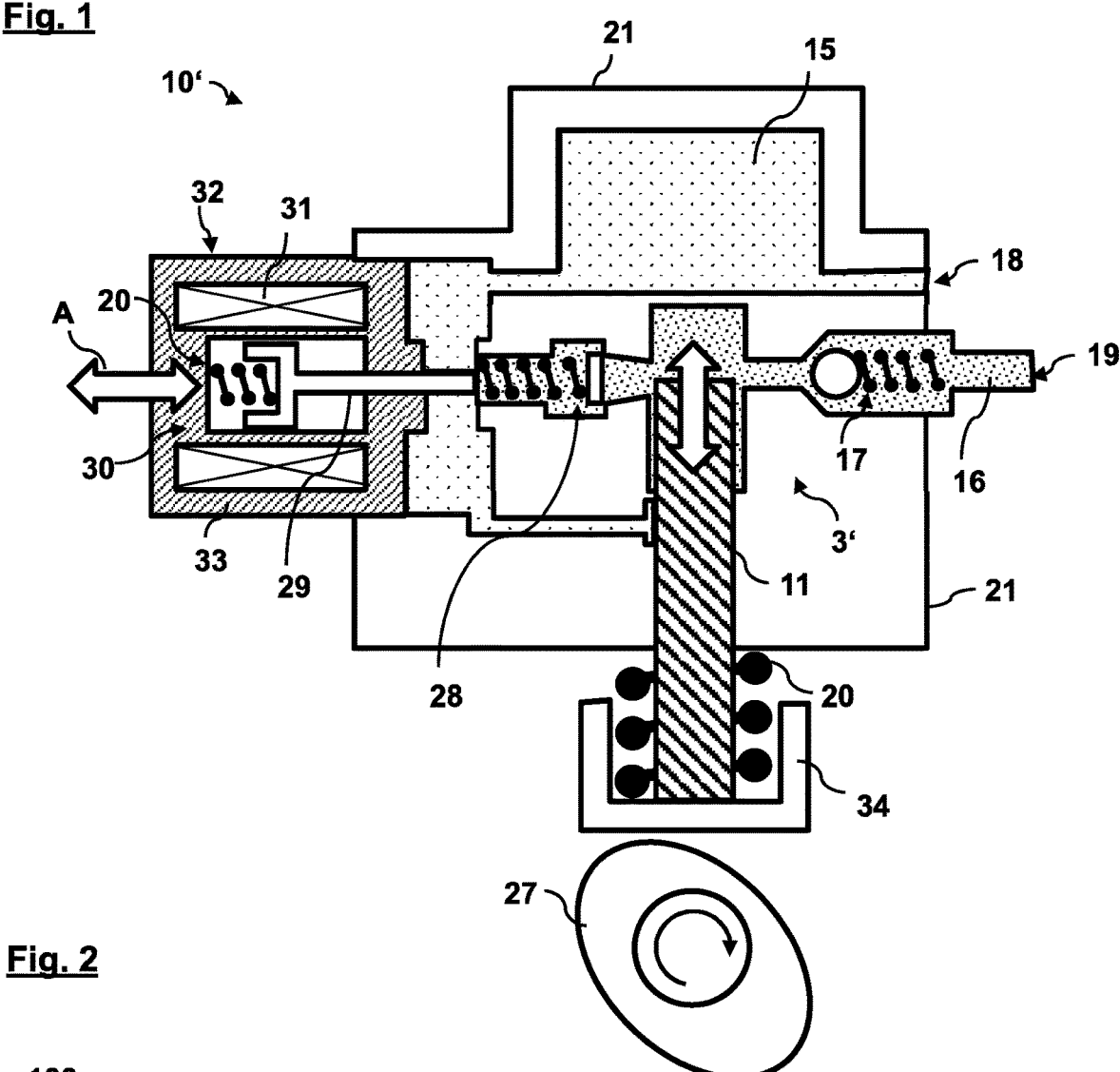
FIG. 1 schematically depicts an example of aspects of a fuel injection system comprising a high-pressure pump according to the prior art.

Although specific exemplary embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific exemplary embodiments discussed herein.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 2:
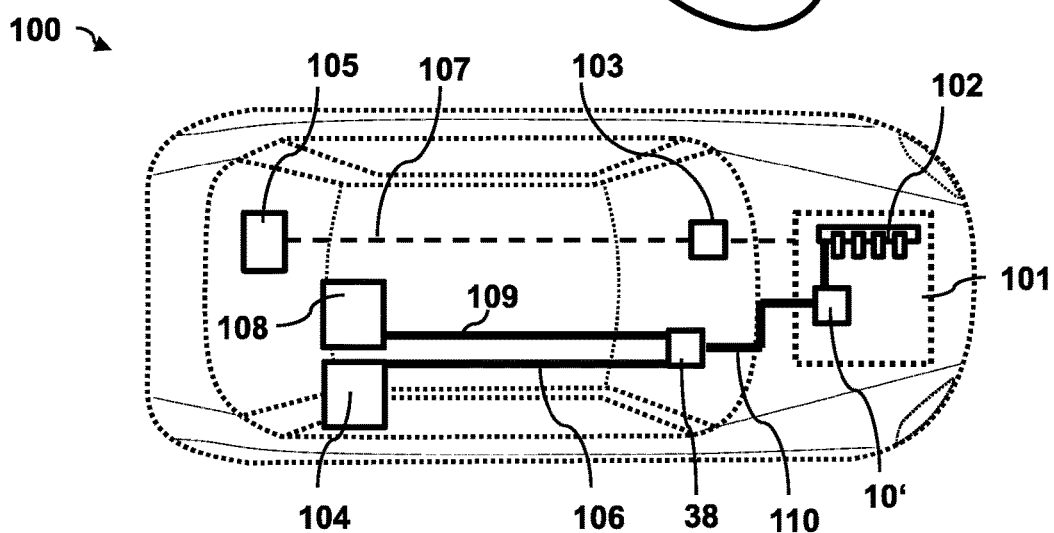
FIG. 2 schematically shows a motor vehicle comprising the fuel injection system of FIG. 1 according to the prior art.

FIG. 1 schematically depicts an example of aspects of a fuel water injection system 10', which may particularly be a gasoline direct water injection (GWDI) system 10' including a digital inlet valve (DIV) 32. FIG. 2 schematically shows a motor vehicle 100 comprising the fuel injection system 10' of FIG. 1.

Since modern vehicles are required to meet highest demands concerning consumption, emission and performance standards, gasoline vehicles are mostly equipped with direct fuel injecting systems. Gasoline direct injection (GDI) indicates that the fuel is injected by an injector directly into a combustion chamber (not depicted) of the engine 101, which then realizes an internal gas mixture. Such GDI systems lead to efficient and clean combustion. However, due to high combustion temperatures, required for high powered engines and high engine speed ranges, temperature levels may exceed acceptable limits for vehicle components such as a turbo charger or an after treatment system.

To prevent malfunction or even damage of these components, it has been increasingly suggested to utilize a direct injection of a water-fuel emulsion to cool down the combustion temperature under certain driving conditions. FIGS. 1 and 2 depict an example for such a GWDI system 10', where water may be selectively admixed to the liquid fuel to form an emulsion of fuel and water, which may then be injected into the combustion chamber under specific driving situations/conditions to maintain the temperatures under an acceptable threshold.

Accordingly, the system 10' includes two low pressure (supply) pumps (not depicted here). A first of the pumps, pumps water at a low pressure, e.g. roughly 3-6 bar, from a water tank 108 via a water line 109 to a water mixer/injector 38 (cf. FIG. 2). The second low-pressure pump pumps gasoline from a fuel tank 104 of the vehicle 100 through a fuel line 106 (also at low pressures, e.g. ~3 bar). At the water mixer/injector 38, the water may then be selectively mixed and/or injected into the stream of liquid fuel based on the driving situation and/or engine condition.

For example, the water mixer/injector 38 may include a mixing chamber (not depicted), in which a pressure difference between the water line 109 and the fuel line 106 may facilitate mixing of both components. Accordingly, the pressure in the water line 109 may be regulated by the respective low-pressure pump. In another example, the water mixer/injector 38 may include an injection nozzle, via which the water is injected from the water line 109 into the fuel stream in the fuel line 106. In the latter case, the water may be delivered within the water line 109 at a constant pressure, which may be greater than the pressure in the fuel line 106. The latter approach may provide increased precision and dynamic range compared to the first approach, which has a comparably slow reaction time and strong dependency on supply line volume. However, both approaches require two dedicated low-pressure pumps, i.e. one for each component of the emulsion, and thus are relatively complex, costly and ineffective.

The resulting liquid fuel water emulsion is then transported via a liquid supply line 110 and pumped via a low-pressure fuel inlet 18 into a low-pressure fuel chamber 15 of the GDI system 10'. The digital inlet valve 32 shown in FIG. 1 regulates transfer of the liquid from the low-pressure fuel chamber 15 to a high pressure fuel chamber 16 of a high pressure fuel pump 3', from where it is ejected via a high pressure fuel outlet 19 into an injection rail 102 and injected into the combustion chamber of the engine 101.

The high-pressure pump 3' is configured to compress the demanded liquid quantity for the injection to a required pressure level, e.g. 50 bar up to roughly 500 bar. Accordingly, the high-pressure pump 3' is driven with a plunger and/or suction piston 11 resiliently connected to a tappet 34 via a return spring 20, the tappet 34 in turn being connected to a camshaft 27 of the engine 101. Thus, a pump frequency of the high-pressure pump 3' is driven by the speed of the internal combustion engine 101 (cf. arrow at the suction piston 11 in FIG. 1 indicating an oscillating movement of the suction piston 11). The DIV 32 thus has to be actuated at a specific time to deliver an adequate amount of liquid (i.e. liquid fuel or fuel-water emulsion) within a given time window. The DIV 32 is operated by an engine control unit (ECU) 103 of the engine 101 based on various sensor data. The ECU 103 in turn is driven by a vehicle battery 105 of the vehicle 100.

The DIV 32 is accommodated inside a DIV housing 33 and includes three separate functional components: a valve seat 28, a valve piston 29 and a valve actuator 30 (cf. left side in FIG. 1). The valve seat 28 is configured to seal the high-pressure fuel chamber 16 of the GDI system 10' against the low-pressure fuel chamber 15 of the GDI system 10' in a closed configuration of the DIV 32. The valve piston 29 is configured to move the valve seat 28 between the closed configuration and an open configuration of the DIV 32, in which the high-pressure fuel chamber 16 is in fluid connection with the low-pressure fuel chamber 15. The valve actuator 30 is configured as an electromagnetic linear actuator to actuate movement of the valve piston 29 along an actuation direction A.

The three functional components, namely the valve seat 28, the valve piston 29 and the valve actuator 30 are joined together in one single integrated component, e.g. made from steel or the like. For example, the functional components may be welded together. The DIV 32 is provided as one fully integrated single structural element to reduce manufacturing costs and simplify the supply chain. The GDI system 10', that is, in particular the DIV 32 and the high-pressure pump 3', is mounted to the engine 101 in a rigid connection, e.g. via a bracket or similar component. This rigid connection is required due to the high forces of several thousand Newton, which are acting on the components during operation.

In general, all vibrating surfaces transfer their movement into the air, which in turn generates spherical outspreading waves. These waves have nearly the same frequency as the vibrating body. The resulting sound or acoustic noise is also called solid-borne sound. In simplified conditions, solid-borne sound corresponds to the resonance frequency of the whole body, including its physical boundaries of mass, stiffness and damping.

Vehicle's noise emission remains one of the key challenges to meet end-user satisfaction. Powertrain acoustics influences, by positive association, in case of "sportive" sound and negative perception in case for harsh sounds. Studies show that common GDI systems are one major source for mechanic noise emission. Particularly, in idle condition, this circumstance may be annoying to both driver and pedestrians. The high-pressure pump in modern gasoline direct injection engines may be perceived as acoustically annoying due to a "ticking" noise, which is emitted over the otherwise very smooth operation of these engines. This ticking sound mainly stems from the fast closing and opening movement of the digital inlet valve 32 regulating fuel inlet into the high-pressure pump 3'. This noise is enhanced due to the fact that the GDI system 10' is mounted on top of the engine 101. Thus, solid borne sound is transmitted via the engine 101 through the entire vehicle 100.

Studies reveal that GDI system noise covers a range between 1.6 kHz up 16 kHz. In simplified terms, this range may be split in two major areas for pump function. Pressure generation impacts the area from roughly 1.6 to 5 kHz, while the digital inlet valve impacts the area from 5 to 10 kHz. The last-mentioned range represents the above-mentioned "ticking" noise.

Moreover, the high-pressure pump 3' is driven by the camshaft 27 of the engine 101 and thus a pump frequency (e.g., pump speed) follows the engine speed of the engine 101. This arrangement may not be optimal in terms of pump and injection efficiency as the pump 3' displacement has to be matched to the engine's 101 highest injection quantity per stroke. Since the layout of the high-pressure pump 3' has to tackle maximum fuel delivery rate over the whole engine duty regime, the pump 3' will usually be run in a part load area. However, as a person of ordinary skill would be aware, parts which are running or operating in part load operation do not meet maximum capable efficiency levels. In addition, since every part has a specific efficiency mapping, a fixed operation condition does not result in highest operation efficiency. Thus, power consumption of the part is increased.

Another drawback of the above system 10' is that once the fluid is within the high-pressure pump 3' and/or the injection rail 102, it is unable to be flushed back and/or drained from there. Accordingly, any liquid, which is not injected into the combustion chamber and remains within the high-pressure system, is unable to be removed. However, an emulsion of water and fuel will separate back to original components in case it is not constantly moved around and thereby stabilized (e.g., separation of the emulsion happens roughly on the order of minutes). Thus, a mixture of freshly delivered emulsion and separated fuel and water may be injected into the combustion chamber during subsequent injection strokes, which may then compromise proper engine functionality.

In the extreme case that only water reaches the injectors, there will be no combustion at all, which may consequently cool down a catalytic converter arranged downstream of the engine, which in turn may lead to higher emission levels. Moreover, if the emulsion remains within the system for a longer period of time, e.g. days or even weeks, internal deposits may form within the system due to the aging tendency of the fuel, which may damage the entire system and shorten lifespan of the engine.

The above drawbacks are overcome by the liquid fuel injection system 10 discussed with reference to FIGS. 3 to 8 according to an exemplary embodiment of the present disclosure.

Figure 3:
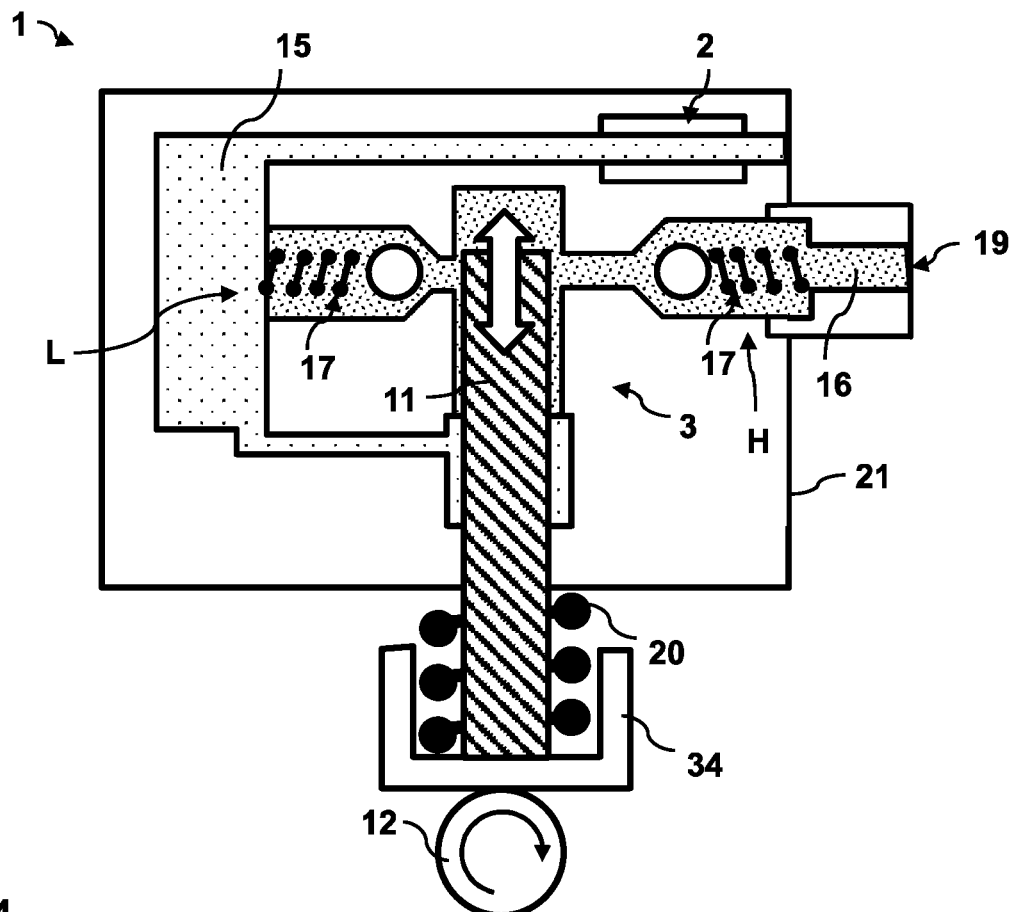
FIG. 3 schematically depicts components of a fuel pump of a liquid fuel water injection system according to an exemplary embodiment of the disclosure.
Figure 4:
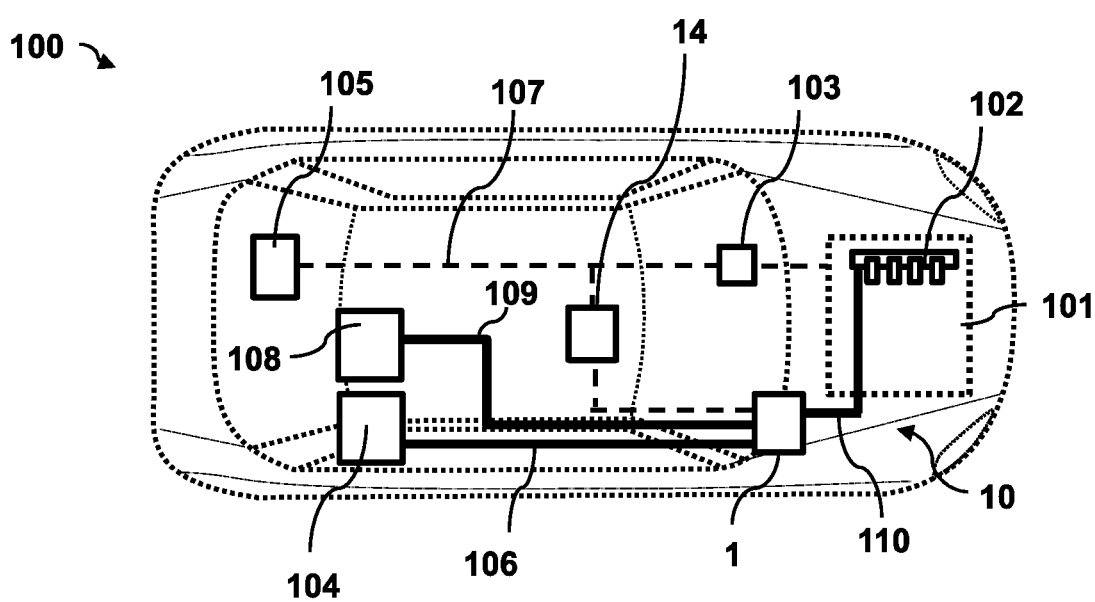
FIG. 4 schematically shows a motor vehicle comprising a liquid fuel water injection system with the fuel pump of FIG. 3 according to an exemplary embodiment of the disclosure.
Figure 5:
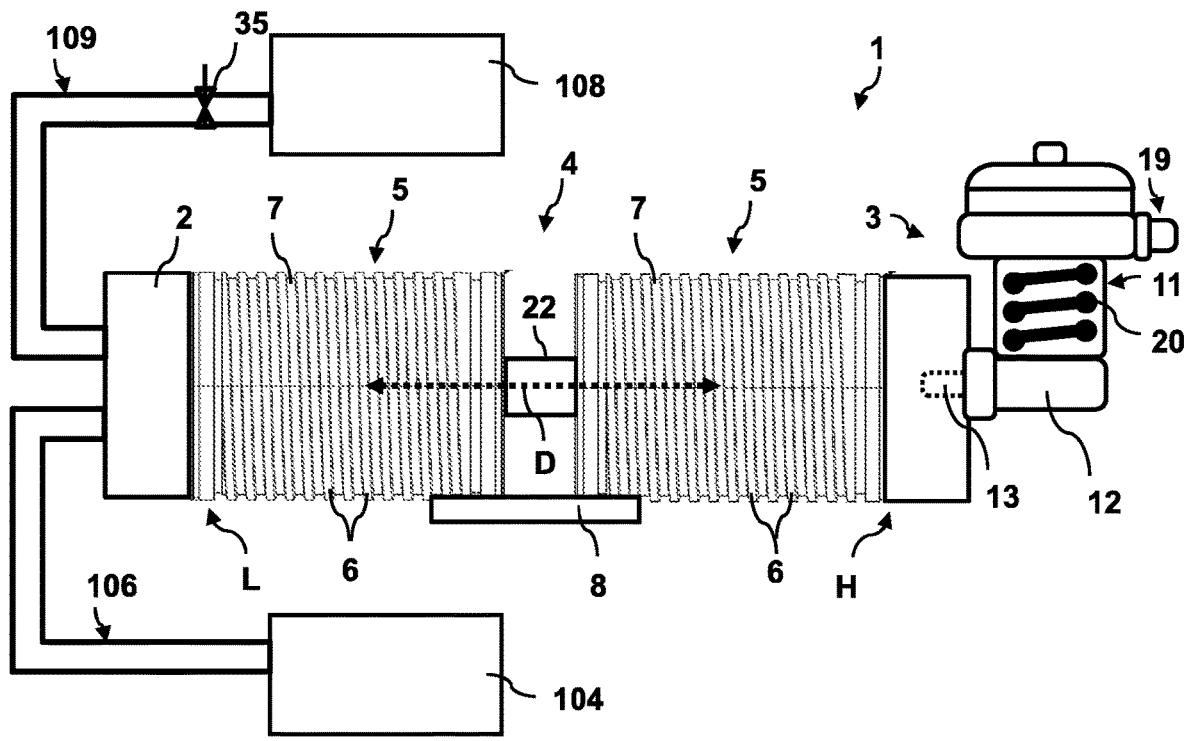
FIG. 5 shows a side view of a fuel pump assembly of the fuel pump from FIG. 3 according to an exemplary embodiment of the disclosure.
Figure 7:
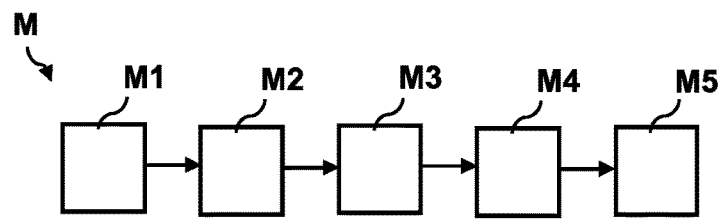
FIG. 7 shows a flow diagram of a method for operating the fuel pump of FIG. 3 according to an exemplary embodiment of the disclosure.
Figure 8:
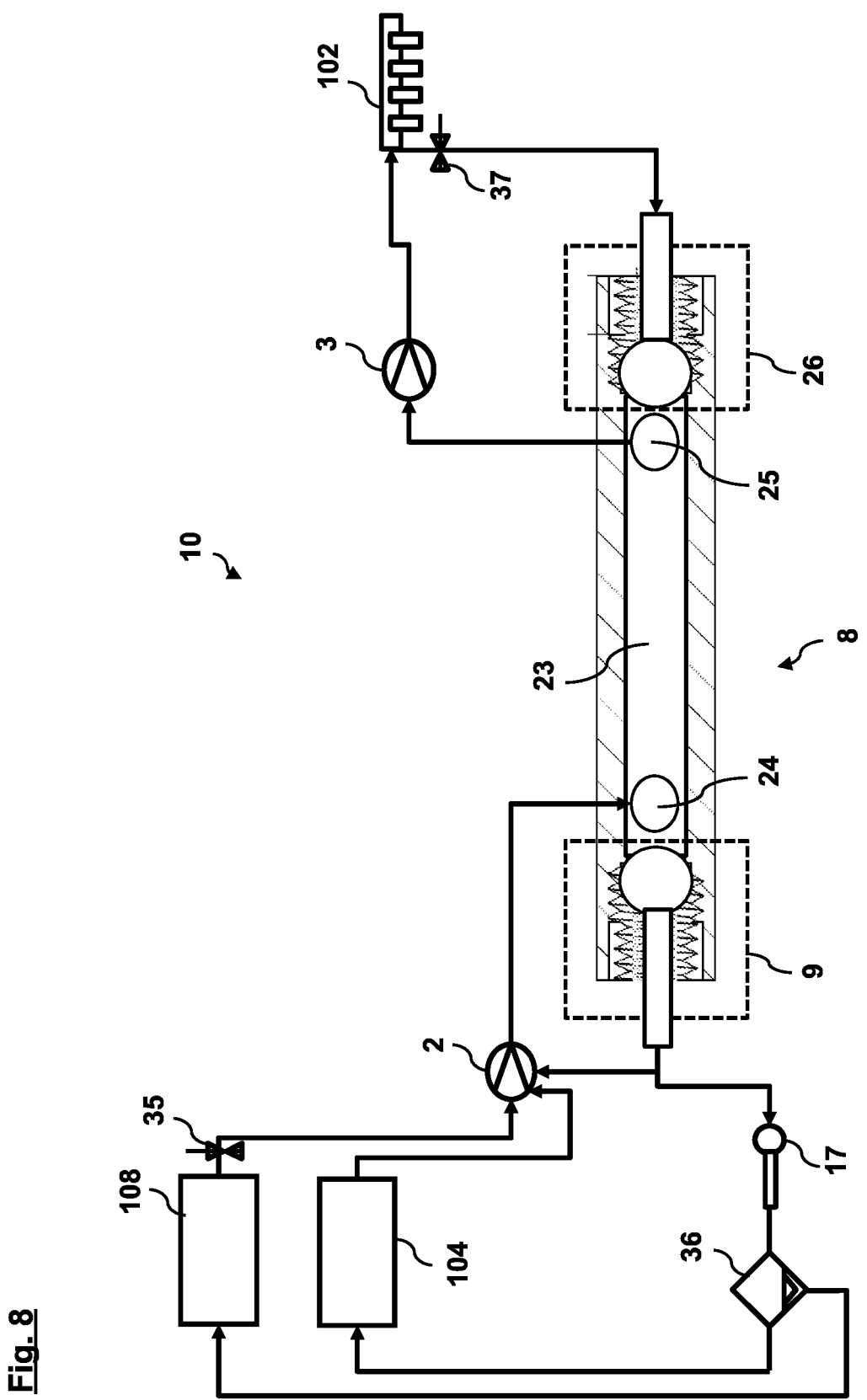
FIG. 8 shows a schematic diagram of the liquid fuel water injection system of FIG. 4 according to an exemplary embodiment of the disclosure.

FIGS. 3 and 5 schematically depict a fuel pump 1 of a fuel injection system 10 according to an exemplary embodiment of the disclosure. FIG. 5 particularly shows a side view of an assembly of the fuel pump 1, wherein the fuel pump 1 is shown without an outer hull or housing. FIG. 4 shows a motor vehicle 100 including a fuel water injection system 10 with the fuel pump 1 of FIGS. 3 and 5. FIG. 7 shows a flow diagram of a method M for operating the fuel pump 1 of FIGS. 3 and 5, while FIG. 8 is a schematic depiction of the respective injection system 10.

This system 10 may also be configured as a GDI system for pumping gasoline from a fuel tank 104 of the vehicle 100 and injecting the gasoline into the engine 101 via an injection rail 102. In other exemplary embodiments, however, the system 10 may inject other forms of liquid fuels, e.g. liquefied fuels like LNG, LPG, CNG and so on. Water may be mixed with the fuel from the fuel tank 104 selectively to provide a fuel water emulsion under certain driving situations and/or engine conditions, which may then be injected into the engine 101, as will be explained in the following.

In particular, the system 10 may include a low-pressure pump 2 configured to mix water from a water tank 108 (provided at a pressure of less than 1 bar) of the motor vehicle 100 with liquid fuel from a fuel tank 104 of the motor vehicle 100 (also provided at a pressure of less than 1 bar) to a liquid fuel water emulsion and provide the liquid fuel water emulsion at a low pressure, e.g. at about 3 bar to 6 bar. The low-pressure pump 2 may be realized in various forms, e.g. as a side channel pump, which is able to mix the components based on an internal swirling movement. However other applicable pump and operation methods are feasible.

The amount of water delivered to the low-pressure pump 2, and thus the water fraction within the emulsion, may be adjusted by a throttle valve 35 within the water line 109 (cf. FIG. 5). Hence, the system 10 of FIGS. 3 to 8 utilizes a single pump configured to operate in a soaking mode to provide a liquid fuel water mixture at a low pressure, wherein the mixing ratio may be adjusted via the throttle valve 35.

It is to be understood that this mixing of fuel and water may be done selectively based on current requirements of the engine. It is to be understood that the fraction of water may be set to zero under certain driving conditions such that only fuel is injected into the combustion chamber. For example, fuel only may be delivered in a "normal" operating mode in contrast to a high load or dynamic mode.

The system 10 may further include a high-pressure pump 3 in fluid communication with the low-pressure pump 2 and configured to compress the delivered liquid from the low pressure to a high pressure, e.g. of about 250 bar to 350 bar, for injecting the liquid into the internal combustion engine 101 of the motor vehicle 100 via the injection rail 102. The high-pressure pump 3 may be provided as a simple 2-poppet valve solution including a poppet valve 17 on a low-pressure side L and a poppet valve 17 on a high-pressure side H.

In contrast to the system 10' of FIGS. 1 and 2, the system 10 of FIGS. 3 to 8 may further include a pump drive 4 configured to drive the low-pressure pump 2 and the high-pressure pump 3 synchronously. The pump drive 4 may be configured to drive a crank drive 12 of the high-pressure pump 3, which is connected to a tappet 34, which in turn drives a suction piston 11 of the high-pressure pump 3 being configured to compress the liquid. The crank drive 12 is shown with a return spring 20 in FIG. 5.

It is to be understood that the crank drive may be configured without such a spring 20 in a rigid assembly between the piston 11 and the tappet 34. A spring may help in some applications to stabilize the system. Depending on the specific use, the suction piston 11 may be configured with a suitable lift range, e.g. of about 2 mm to 5 mm. The lift range should be adapted for low mass per lift but high enough to compress and deliver sufficient fuel.

Hence, in the exemplary embodiment of FIGS. 3 to 8, the high-pressure pump 3 is not coupled to a camshaft of the engine 101. Instead, the high-pressure pump 3 is decoupled from the engine 101 and solely driven by the pump drive 4 provided for this particular purpose. In fact, the entire fuel pump 1 may be mechanically detached and spaced apart from the internal combustion engine 101 (cf. FIG. 4). For example, the pump 1 may be mounted within an underfloor of the vehicle 100 or within a separate compartment in the engine cabinet.

Consequently, the pump drive 4 may be configured to drive the pumps 2, 3 with a pump frequency independently from an engine speed of the internal combustion engine 101 of the motor vehicle 100. Thus, the solution of this exemplary embodiment departs from the commonly followed approach of fixedly connecting the GDI system to the engine mechanics. This overcomes the drawbacks of the system 10' of FIGS. 1 and 2, as will be explained further below.

Accordingly, the method M for operating the fuel pump 1 may include under M1 (cf. FIG. 7) mixing water from the water tank 108 of the motor vehicle 100 with liquid fuel from the fuel tank 104 of the motor vehicle 100 to a liquid fuel water emulsion and under M2 pumping the liquid fuel water emulsion with the low-pressure pump 2 at the low pressure. The method M may further include under M3 compressing the liquid fuel water emulsion from the low pressure to the high pressure with the high-pressure pump 3 for injecting the liquid fuel water emulsion into the internal combustion engine 101 of the motor vehicle 100 via the injection rail 102 of the motor vehicle 100. In particular, the low-pressure pump 2 and the high-pressure pump 3 may be driven synchronously by the pump drive 4 with a pump frequency independently from an engine speed of the internal combustion engine 101 of the motor vehicle 100.

Figure 6:
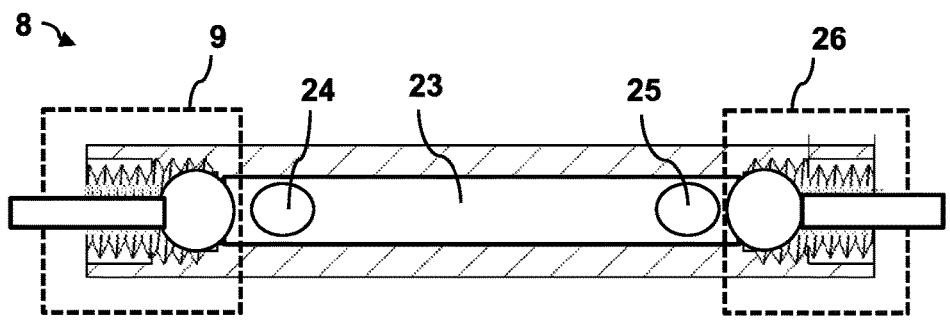
FIG. 6 shows a cross-sectional view of a hydraulic regulator of the fuel pump in FIG. 5 according to an exemplary embodiment of the disclosure.

Referring now to FIGS. 5 and 6, the pump drive 4 is configured as an electric motor and may include two electric submachines 5 axially coupled to each other via an electric and mechanical connection 22 between the low-pressure pump 2 and the high-pressure pump 3. Each electric submachine 5 may include a helical cooling channel 6 integrated into its respective outer hull 7, which is configured to flush the liquid from the low-pressure side L (that is, from the low-pressure pump 2) to the high-pressure side H (i.e. to the high-pressure pump 3) along a helical path around an axial direction D of the respective electric submachine 5. Due to the tumbling movement through the helical channels 6, the emulsion may be mixed continuously and thereby stabilized, that is, the emulsion is prevented from separating.

Both electric submachines 5 may be fluidly connected to each other via a hydraulic regulator 8 providing a pressure regulated connection between the electric submachines 5 for conducting the liquid between the electric submachines 5, that is, between the helical cooling channels 6 of both submachines 5. The hydraulic regulator 8 is shown in more detail in FIG. 6. As shown, the hydraulic regulator 8 may include a main regulator supply line 23 for transporting the liquid from the helical cooling channel 6 of the electric submachine 5 on the low-pressure side L to the electric submachine 5 on the high-pressure side H, that is, from left to right in FIG. 5. Accordingly, the hydraulic regulator 8 may include a regulator inlet 24 and a regulator outlet 25 in fluid connection with the main regulator supply line 23 on the one side and the respective cooling channel 6 on the other. The regulator inlet 24 and the regulator outlet 25 may, for example, be configured as simple ball valves or the like.

Furthermore, the hydraulic regulator 8 may include an overflow return valve 9 for pressure regulating a backflow of liquid from the high-pressure side H to the low-pressure side L (left in FIG. 6) as well as an injection rail relief 26 (right in FIG. 6) for receiving liquid from the injection rail 102 back into the hydraulic regulator 8, as will be explained further below with reference to FIG. 8.

The fuel pump 1 may be configured to operate in a pump frequency range between 0 rpm and 16.000 rpm with a flow rate between 0 kg/h and 100 kg/h] to be able to deliver the liquid (either fuel or emulsion) in small quantities but with high pump speed to the injection rail 102. This offers the possibility to control the injection process more accurately. Rapid transitions between different driving situations may be handled due to this in a highly effective way.

The pump drive 4 may be configured as a brushless DC motor or similar, e.g. with each electric submachine 5 being able to deliver up to about 500 W at an operating voltage of 48 V (48 V may be more suitable than 12 V as the latter may encounter high currents). A vehicle battery 105 may deliver the necessary electric energy to the pump drive 4 via a dedicated electric line 107. A DC-DC converter (not depicted) may be configured to convert the 12 V of the vehicle battery 105 to the 48 V required by the pump drive 4.

The fuel pump 1 may include a pump control unit 14 or pump controller, which is shown in FIG. 4 spaced apart from the fuel pump 1 for the sake of clarity. It is to be understood however, that the pump controller 14 may be integrated into the fuel pump 1. In this particular exemplary embodiment, the pump controller 14 is provided in addition to an ECU 103. However, in other exemplary embodiments, the control functions of the pump controller 14 may be fulfilled by the ECU 103. A separate pump controller 14 may enable to retrofit the present system 10 in vehicles equipped with conventional systems.

The fuel pump 1 may be configured to receive power from the pump controller 14, which in turn is powered by the vehicle battery 105. The pump controller 14 may include rail pressure control logic, e.g. based on actual values and predefined set points. The pump controller 14 may particularly be configured to operate the fuel pump 1 based on pressure control commands based on on-board diagnostics controller area network (CAN) signals for further simplification. These signals follow international standards and thus the system 10 may be used across different manufacturers without modification.

The present disclosure thus is able to significantly reduce the ticking noise of common digital inlet valves by decoupling the fuel injection system 10 and in particular the fuel pump 1 from the engine 100. The digital inlet valve may be omitted entirely. Since the fuel pump 1 may be driven by a dedicated pump drive 4, the pump 1 may be configured relatively freely (compared to the conventional systems) and thus one single pump type may fulfill the requirements of various different types of vehicles for diverse driving situations and engine conditions. This also means that the power consumption of the fuel system may be lowered.

As a result, the number of parts and the total costs may be reduced and the whole supply infrastructure may be simplified. To achieve this, the present disclosure follows a completely new pump approach based on synchronously driven low- and high-pressure pumps and a "one-shaft" arrangement of pumps 2, 3 and electric machines 5 (cf. FIG. 5, which shows the arrangement of these components along one shared axis). The present system may be provided as a retrofit and back-up solution without having to access the ECU on a developer level.

Referring now to FIG. 8, further aspects of the present system 10 are explained that allow any unwanted fluids to be purged from the injection system 10. FIG. 8 shows the hydraulic regulator 8 from FIG. 6 together with the rest of the injection system 10 including the low-pressure pump 2, the high-pressure pump 3, both tanks 104, 108 as well as the injection rail 102. As described above, the low-pressure pump 2 may be configured to receive fuel from the fuel tank 104 and mix the fuel selectively with water from the water tank 108. The actual amount of water may be adjusted via throttle valve 35. The resulting emulsion (or, just fuel in case that no water cooling is required under the current driving/engine conditions) may then be flushed from the low-pressure pump 2 at the regulator inlet 24 into the hydraulic regulator 8 and from there via the regulator outlet 25 to the high-pressure pump 3, which delivers it to the injection rail 102.

As already mentioned above, the hydraulic regulator 8 may include an overflow return valve 9 for pressure regulation. More specifically, the overflow return valve 9 may be configured to deliver backflow of liquid to the low-pressure fuel pump 2 for mixing of the liquid fuel water emulsion. Alternatively, the overflow return valve 9 is able to guide the liquid to an emulsion separation device 36 via a poppet valve 17. The emulsion separation device 36 may be configured to separate water and liquid fuel from the liquid fuel water emulsion and guide the separated components to their respective tanks 104, 108.

In addition, the hydraulic regulator 8 may include an injection rail relief 26 in fluid communication with a pressure relief valve 37 of the injection rail 102. The pressure relief valve 37 may be configured to purge liquid from the injection rail 102 to the fuel pump 2 via the injection rail relief 26. From there the drained liquid may then be further channeled through the overflow return valve 9. For example, the liquid fuel water emulsion may be purged from the injection rail 102 if no longer required and then be separated into original components by the emulsion separation device 36. Alternatively, however, the drained liquid may also be refilled directly into the injection rail 102 from the hydraulic regulator 8 via the high-pressure pump 3 together with new liquid freshly delivered from the low-pressure pump 2.

The above provisions now allow to reuse and/or purge any fluid remaining in the injection rail 102. The thus drained fluid may be fed directly back into the injection rail 102 or used for remixing within the low-pressure pump 2. Alternatively, or additionally, the purged fluid may be filled back into the supply tanks 104, 108.

As one particular example, under normal engine operation, that is, under low and medium engine load, the injection rail relief 26 and/or the pressure relief valve 37 may be closed. Pressure may be regulated via the overflow return valve 9 back to the low-pressure side L and to a mixing chamber and/or an inlet of the low-pressure pump 2. The lower density component, e.g. gasoline in case of a gasoline water mixture, may be the major return medium in this case and, thus, may stabilize the emulsion pumped via the low-pressure pump 2.

In another example, the mixture of fuel and water may be readjusted within the injection rail 102. This may be accomplished by draining part of the rail volume or purging the entire rail for example by electrically actuating the pressure relief valve 37 of the injection rail 102. The drained or purged fluid may then be filled back into the injection rail 102 from the hydraulic regulator 8 by means of the high-pressure pump 3. This procedure may be done continuously for permanent rail circulation or infrequently to facilitate a total draining in applications with high dynamics such as motorsport.

In a further example, during engine shut off (start/stop), the injection rail 102 may be drained entirely. The liquid may then be filled back to a mixing chamber and/or an inlet of the low-pressure pump 2. In particular, it is particularly relevant that the present pump solution runs independently from the engine 101, which is switched off here. The injection rail 102 may be frequently purged and refilled by fully opening and closing the pressure relief valve 37. Accordingly, the fuel ratio may be increased to highest levels immediately after engine shut off and before engine (re)start.

In a yet further example, the engine 101 may be shut off entirely for a longer period. When the system 10 runs effectively in reverse, the injection rail 102 may be drained entirely via the pressure relief valve 37 and the fluid may be drained from there through the overflow return valve 9 into the emulsion separation device 36. The emulsion separation device 36 may then split up the emulsion into its components, which may then be filled back into the supply tanks 104, 108. Accordingly, the entire system 10 may be cleaned from any remaining liquid. Also in this case it is essential that the present pump solution is able to run independently from the engine 101.

Accordingly, again referring to FIG. 7, the method M may further include under M4 purging the liquid fuel water emulsion from the injection rail by a pressure relief valve 37 and under M5 separating the purged liquid into water and liquid fuel by an emulsion separation device 36.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents of the different features and embodiments. Many other examples will be apparent to one skilled in the art upon reviewing the above specification. The embodiments were chosen and described to explain the principles of the disclosure and its practical applications, to thereby enable others skilled in the art to utilize the disclosure and various embodiments with various modifications as are suited to the particular use contemplated.

REFERENCE LIST 1 fuel pump
2 low-pressure pump
3, 3' high-pressure pump
4 pump drive
5 electric submachine
6 helical cooling channel
7 outer hull
8 hydraulic regulator
9 overflow return valve
10, 10' liquid fuel injection system
11 suction piston
12 crank drive
13 crank shaft
14 pump control unit
15 low-pressure fuel chamber
16 high-pressure fuel chamber
17 poppet valve 18 low-pressure fuel inlet
19 high-pressure fuel outlet
20 return spring
21 pump housing
22 electromechanical connector
23 main regulator supply line
24 regulator inlet
25 regulator outlet
26 injection rail relief
27 engine camshaft
28 valve seat
29 valve piston
30 valve actuator
31 magnetic coil
32 digital inlet valve (DIV)
33 DIV housing
34 tappet
35 throttle valve
36 emulsion separation device
37 pressure relief valve
38 water mixer/injector
100 motor vehicle
101 internal combustion engine
102 injection rail
103 engine control unit (ECU)
104 fuel tank
105 vehicle battery
106 fuel line
107 electric line
108 water tank
109 water line
110 liquid supply line
L low-pressure side
H high-pressure side
D axial direction
A actuation direction
M method
M1-M5 method steps

What is claimed is:

1. A fuel pump for a liquid fuel water injection system of a motor vehicle, comprising:
   a low-pressure pump configured to mix water from a water tank of the motor vehicle with liquid fuel from a fuel tank of the motor vehicle to a liquid fuel water emulsion and provide the liquid fuel water emulsion at a low pressure;
   a high-pressure pump in fluid communication with the low-pressure pump and configured to compress the liquid fuel water emulsion from the low pressure to a high pressure for injecting the liquid fuel water emulsion into an internal combustion engine of the motor vehicle via an injection rail of the motor vehicle;
   a pump drive configured to drive the low-pressure pump and the high-pressure pump synchronously with a pump frequency independently from an engine speed of the internal combustion engine of the motor vehicle; and
   a throttle valve configured to adjust an amount of water provided from the water tank or liquid fuel from the fuel tank to be mixed to the liquid fuel water emulsion within the low-pressure pump.

2. The fuel pump according to claim 1, wherein the pump drive is configured as an electric motor.

3. The fuel pump according to claim 2, wherein the pump drive includes at least two electric submachines axially coupled to each other between the low-pressure pump and the high-pressure pump.

4. The fuel pump according claim 3, wherein each electric submachine includes a helical cooling channel configured to flush the liquid fuel water emulsion from a low-pressure side to a high-pressure side along a helical path around an axial direction of the respective electric submachine.

5. The fuel pump according claim 4, wherein each helical cooling channel is integrated into an outer hull of the respective electric submachine.

6. The fuel pump according to claim 5, further comprising:
   a hydraulic regulator providing a pressure regulated connection between the electric submachines for conducting the liquid fuel water emulsion between the electric submachines.

7. The fuel pump according to claim 6, wherein the hydraulic regulator includes an overflow return valve for pressure regulating a backflow of liquid from the high-pressure side to the low-pressure side.

8. The fuel pump according to claim 7, wherein the overflow return valve is configured to deliver the backflow of liquid to the low-pressure fuel pump for mixing of the liquid fuel water emulsion.

9. The fuel pump according to claim 8, further comprising:
   an emulsion separation device configured to separate water and liquid fuel from the liquid fuel water emulsion,
   wherein the overflow return valve is configured to deliver the backflow of liquid to the emulsion separation device.

10. The fuel pump according to claim 9, wherein the hydraulic regulator includes an injection rail relief configured to receive liquid from the injection rail back into the hydraulic regulator.

11. The fuel pump according to claim 10, wherein the high-pressure pump includes a suction piston configured to compress the liquid fuel water emulsion being conducted from the low-pressure pump to the high-pressure pump and a crank drive driven by the pump drive and configured to drive the suction piston.

12. A motor vehicle comprising:
   an internal combustion engine and a liquid fuel water injection system configured to inject liquid fuel water emulsion into the internal combustion engine via an injection rail,
   wherein the liquid fuel water injection system includes a fuel pump according to claim 1.

13. The motor vehicle according to claim 12, wherein the fuel pump is mechanically detached from the internal combustion engine of the motor vehicle, and wherein the fuel pump is in fluid communication with the injection rail (102) of the internal combustion engine via a liquid supply line.

14. The motor vehicle according to claim 13, wherein the fuel pump is powered by a vehicle battery of the motor vehicle.

15. The motor vehicle according to claim 14, wherein the injection rail includes a pressure relief valve configured to purge liquid from the injection rail to the fuel pump.

16. A method for operating a fuel pump according to claim 1, comprising:
   mixing water from the water tank of the motor vehicle with liquid fuel from the fuel tank of the motor vehicle to a liquid fuel water emulsion;
   pumping the liquid fuel water emulsion with the low-pressure pump at the low pressure; and
   compressing the liquid fuel water emulsion from the low pressure to the high pressure with the high-pressure pump for injecting the liquid fuel water emulsion into the internal combustion engine of the motor vehicle via the injection rail of the motor vehicle;

wherein the low-pressure pump and the high-pressure pump are driven synchronously by the pump drive with the pump frequency independently from the engine speed of the internal combustion engine of the motor vehicle.

17. The method according to claim 16, further comprising:

purging the liquid fuel water emulsion from the injection rail by a pressure relief valve.

18. The method according to claim 17, further comprising:

separating the purged liquid fuel water emulsion into water and liquid fuel by an emulsion separation device.

* * * * *